United States Patent
Ng

(10) Patent No.: US 6,957,776 B1
(45) Date of Patent: Oct. 25, 2005

(54) SYSTEM AND METHOD FOR MANAGING A PLURALITY OF LOCAL LISTS OF A SINGLE USER

(75) Inventor: Yvonne Ng, Superior, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/538,767

(22) Filed: Mar. 30, 2000

(51) Int. Cl.[7] ............................................. G06K 7/016
(52) U.S. Cl. ...................... 235/474; 235/375; 235/376; 235/380; 235/492
(58) Field of Search ................................ 235/474, 492, 235/375, 376, 380

(56) References Cited

U.S. PATENT DOCUMENTS

| | | | |
|---|---|---|---|
| 5,313,211 A * | 5/1994 | Tokuda et al. ................. 342/50 |
| 5,578,808 A * | 11/1996 | Taylor .......................... 235/380 |
| 5,633,484 A * | 5/1997 | Zancho et al. ............... 235/380 |
| 5,694,471 A * | 12/1997 | Chen et al. ................... 380/25 |
| 5,744,787 A * | 4/1998 | Teicher ........................ 235/380 |
| 5,982,520 A * | 11/1999 | Weiser et al. ............... 359/152 |
| 5,983,273 A * | 11/1999 | White et al. ................. 709/229 |
| 6,000,000 A * | 12/1999 | Hawkins et al. ............ 707/201 |
| 6,141,752 A * | 10/2000 | Dancs et al. ................. 713/172 |
| 6,178,403 B1 * | 1/2001 | Detlef ........................ 704/270 |
| 6,194,992 B1 * | 2/2001 | Short et al. .................. 340/5.9 |
| 6,199,762 B1 * | 3/2001 | Hohle .......................... 235/492 |
| 6,296,191 B1 * | 10/2001 | Hamann et al. ............ 235/492 |

FOREIGN PATENT DOCUMENTS

WO  WO 9000782  *  1/1990  .......... G07C 11/08

OTHER PUBLICATIONS

Press Release, PubliCard, May 12, 1999.

* cited by examiner

Primary Examiner—Diane I. Lee
Assistant Examiner—Seung H Lee
(74) Attorney, Agent, or Firm—Brooks Kushman P.C.

(57) ABSTRACT

A system for managing a plurality of local lists of a single user includes a compact user-carried smart card including a microprocessor and a memory storing a master list. The plurality of local lists is located at a plurality of remote appliances. Each appliance holds a corresponding local list and includes a card reader. The master list is configured for synchronizing with each local list. The microprocessor is programmed to synchronize the master list with the local list on a remote appliance when the smart card is engaged with the remote appliance card reader. Synchronization allows the user to carry the smart card with the master list stored in the smart card memory to various remote appliances and synchronize the master list with the various local lists of the appliances.

16 Claims, 2 Drawing Sheets

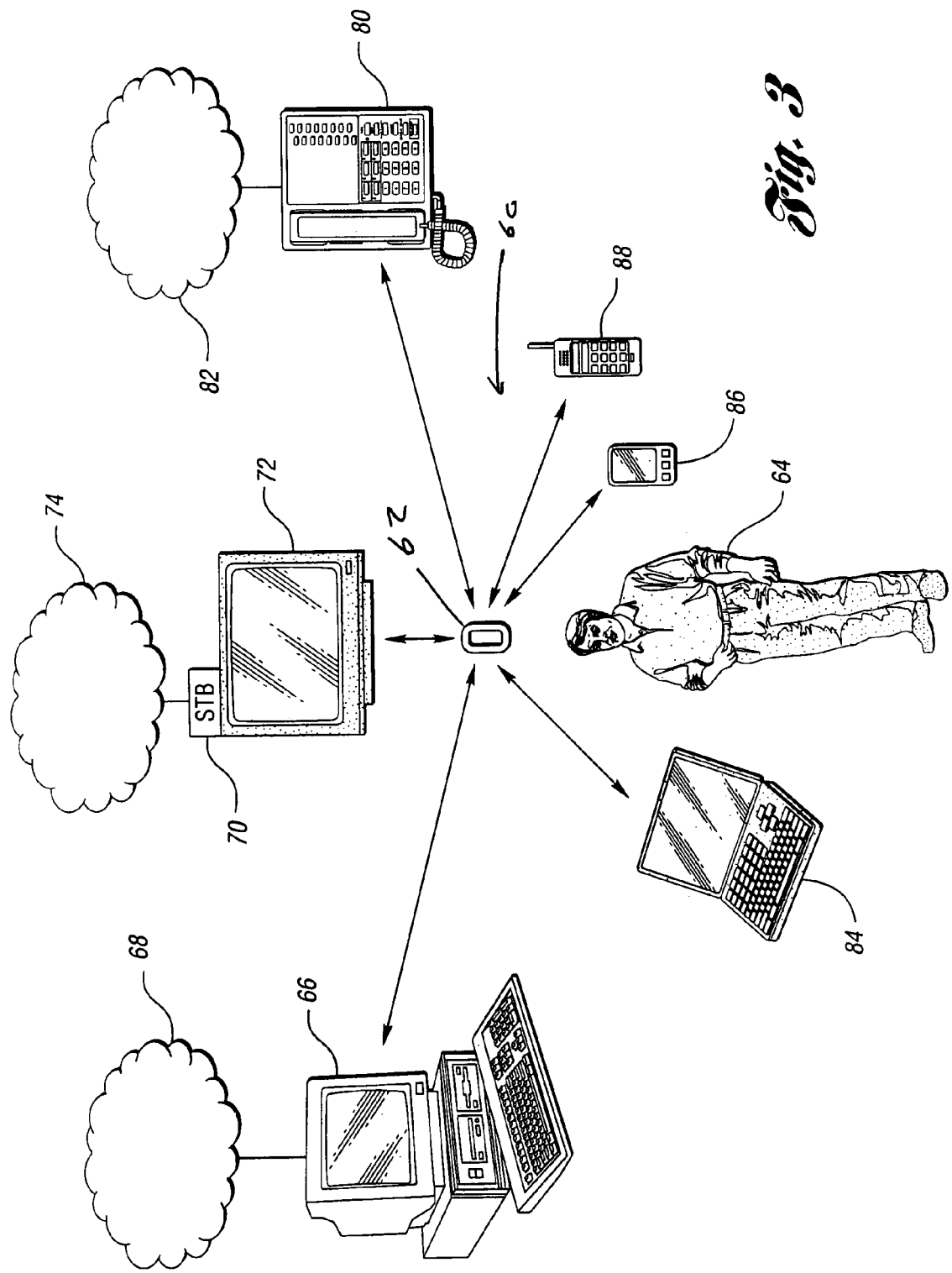

SYSTEM AND METHOD FOR MANAGING A PLURALITY OF LOCAL LISTS OF A SINGLE USER

TECHNICAL FIELD

The present invention relates to a system and method for managing a plurality of local lists of a single user located at a plurality of remote appliances.

BACKGROUND ART

The use of information management products has become widespread. For example, numerous products, both hardware and software based, contain address books or other similar lists that allow the user to keep names, telephone numbers, e-mail addresses, bookmarks, and other personal contact information. However, these products do not all currently exist on the same network, nor are they all web-enabled. Therefore, a problem arises when a user that uses some, or all, of those products for various purposes, has no easy way of synchronizing and accessing the lists.

Unfortunately, although each product, alone, may be quite useful, it becomes difficult and cumbersome for the user to manage multiple lists of information on different products. For example, a user may have a computer software program at work that contains an address and phone number list. That same user may also have address and phone number software on a different computer, such as a home computer. If it is not possible to network these two computers together, a user is faced with the cumbersome and difficult task of managing both lists separately. Although some attempts have been made to provide portable devices that can store information for a user, such as a personal digital assistant, the management of the personal digital assistant and the various other devices that a user may own still, at times, becomes difficult.

For the foregoing reasons, there is a need for a system and method for managing a plurality of local lists that overcomes the problems and limitations of the prior art.

DISCLOSURE OF INVENTION

It is, therefore, an object of the present invention to provide a system and method for managing a plurality of local lists of a single user utilizing a compact user-carried smart card including a microprocessor and a memory storing a master list configured for synchronizing with each local list.

In carrying out the above object, a system for managing a plurality of local lists of a single user is provided. The plurality of local lists is located on a plurality of remote appliances. Each appliance holds a corresponding local list and includes a card reader. The system comprises a compact user-carried smart card. The smart card includes a microprocessor and a memory. The memory stores a master list. The master list is configured for synchronizing with each local list. The microprocessor is programmed to synchronize the master list with a local list on a remote appliance when the smart card is engaged with the remote appliance card reader to allow the user to carry the smart card with the master list stored in the smart card memory. A user may carry the smart card to various remote appliances and synchronize the master list with the various local lists of the appliances.

Advantageously, the user may carry a single compact smart card that holds a master list. The smart card acts as a token, and synchronizes any local list with the master list. Further, the smart card, on some appliances, where there is no local list, may allow the user to access the master list.

In a preferred implementation, an access type of remote appliance is configured to display a list and includes a card reader. The microprocessor is further programmed to send the master list to the access type remote appliance for display thereon when the smart card is engaged with the remote appliance card reader of the access type remote appliance.

It is to be appreciated that the list may include a plurality of entries of various types. For example, entries may include addresses such as residential or work addresses. Further, entries may include names, telephone numbers (pager numbers, other numbers such as a fax machine, etc.), e-mail addresses, electronic bookmarks, and even browser or desktop preferences for a computer or web access device. Even further, the memory may store an electronic wallet. In a preferred embodiment, the memory stores an encrypted smart card password to control access to the master list. Further, all the data on the smart card may be encrypted for privacy. As such, a lost smart card does not result in all of a user's personal information falling into the hands of another.

Further, in carrying out the present invention, a system for managing a plurality of local lists of a single user is provided. The system comprises a plurality of remote appliances for use on different networks wherein each appliance holds a corresponding local list of the plurality of local lists. Each appliance includes a card reader. The system further comprises a compact-user carried smart card including a microprocessor and a memory. The memory stores the master list. The master list is configured for synchronizing with each local list. The microprocessor is programmed to synchronize the master list with a local list on a remote appliance when the smart card is engaged with the remote appliance card reader to allow the user to carry the smart card with the master list stored in the smart card memory. A smart card may be carried by the user to various remote appliances allowing the user to synchronize the master list with the various local lists of the appliances.

In some applications, the plurality of remote appliances includes at least one access type of remote appliance configured to display a list and including a card reader. The microprocessor is further programmed to send the master list to the access type remote appliance for display thereon when the smart card is engaged with the remote appliance card reader of the at least one access type remote appliance. In some applications, the plurality of remote appliances includes web enabled appliances and non-web-enabled appliances.

It is appreciated that the memory may store a plurality of different types of information including addresses, names, telephone numbers, e-mail addresses, electronic bookmarks, electronic wallet information, passwords, etc.

Still further, in carrying out the present invention, a method for managing a plurality of local lists of a single user is provided. The method comprises storing a plurality of local lists on a plurality of corresponding remote appliances. Each appliance includes a card reader. The method further comprises storing a master list on a compact user-carried smart card including a microprocessor and a memory. The memory stores the master list. The master list is configured for synchronizing with each local list. The microprocessor is programmed to synchronize the master list with a local list on a remote appliance when the smart card is engaged with the remote appliance card reader.

In a preferred embodiment, the method further comprises synchronizing the master list with at least one of the local lists. Even further, in a preferred embodiment, the plurality of remote appliances includes an access type of remote appliance configured to display a list and including a smart card reader. The method further comprises sending the master list to the access type remote appliance for display thereon when the smart card is engaged with the remote appliance card reader of the access type remote appliance.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 3 illustrates the interaction of a compact user-carried smart card of the present invention with various remote appliances.

BEST MODE FOR CARRYING OUT THE INVENTION

Figure 1:
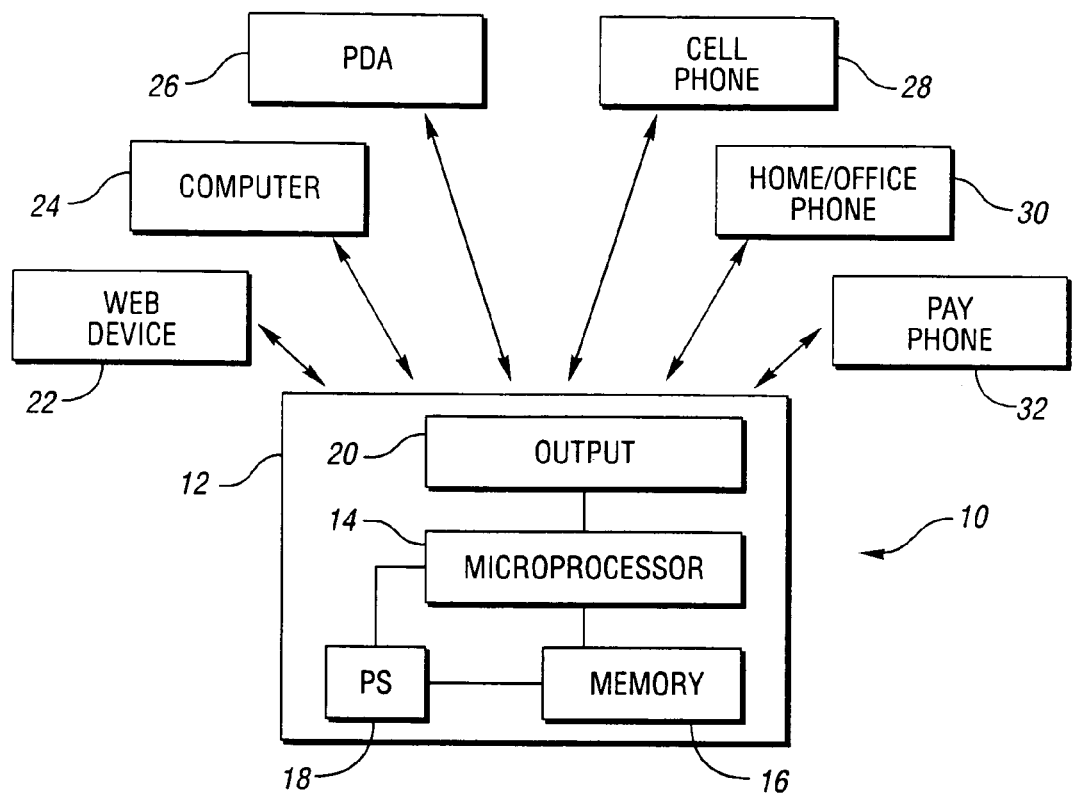
FIG. 1 is a block diagram illustrating a compact user-carried smart card of the present invention, illustrating the ability of a smart card to synchronize the master list with various local lists on various remote appliances.

With reference to FIG. 1, a system of the present invention is generally indicated at 10. In methods and systems of the present invention, a compact user-carried smart card is utilized to access and manage a master list with multiple appliances. The smart card is used to store, access, synchronize, and manage information among various information appliances and applications. As shown, smart card 12 includes a microprocessor 14 and memory 16. As shown, smart card 12 includes a power supply 18. Further, smart card 12 includes output logic 20. It is appreciated that the output portion 20 of smart card 12 may take many forms. For example, output logic 20 may communicate with the various remote appliances through a contact or contactless connection, as appreciated by those skilled in the art.

Further, it is appreciated that embodiments of the present invention are not limited to any particular types of remote appliances. The illustrated examples include a web device 22, a computer 24, a personal digital assistant 26, a cellular phone 28, a home or office phone 30, and a pay phone 32 (such as a public telephone). Smart card 12 is preferably approximately credit card size, for easy carrying by the user. In accordance with the present invention, the smart card, being compact and user-carried and having processing power and memory, is a token for holding the master list or most current data for the user's various information lists. Smart card 12 is used to synchronize with the individual lists of different applications and appliances that utilize different hardware on separated networks.

Figure 2:
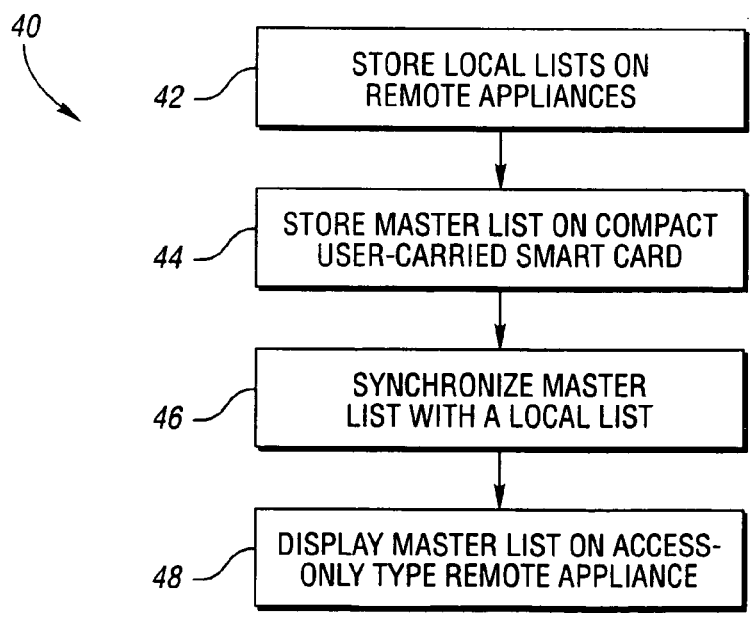
FIG. 2 is a block diagram illustrating a method of the present invention.

With reference to FIG. 2, a method of the present invention is generally indicated at 40. At block 42, local lists are stored on remote appliances. At block 44, the master list is stored on a compact user-carried smart card. At block 46, the master list is synchronized with the local list. That is, the user carries the smart card on his or her person, allowing the user to go to various remote appliances and applications and synchronize the master list with the various local lists of the appliances and applications. At block 48, the master list is displayed on an access-only type of remote appliance. For example, a public phone may be configured to read the smart card and display the information stored therein, but not allow the user to modify that information at the public phone.

Advantageously, smart card acts as a token for holding the master list for various local lists kept on various devices. As best shown in FIG. 3, smart card 62 makes information managing less difficult and cumbersome for user 64. As illustrated, the master list on smart card 62 may synchronize with a local list on a computer 66. Computer 66 is shown connected to a network 68. Further, the master list on smart card 62 may synchronize with a local list of information stored in a set top box 70 connected to a television 72. Set top box 70 is connected to a network 74. Set top box 70 may be configured for web access, with smart card 62 storing bookmarks or browsing preferences.

Further, smart card 62 may synchronize with a local list on a telephone 80, connected to a telephone network 82. For example, the smart card 62 may store speed dial numbers, or even messages provided that the smart card has sufficient memory.

Even further, in the examples of FIG. 3, smart card 62 may synchronize with a laptop computer 84, a personal digital assistant 86, or even a cellular telephone 88. Advantageously, the compact user-carried smart card may interoperate with hardware appliances and software applications that include a personal address book of some form, or any other information that is normally managed by any of these appliances or applications for a user. The hardware or software allows the user to keep, access, and manage a list of, for example, speed dial numbers, e-mail addresses, bookmarks, or other personal contact information, in addition to any other types of information. When users use more than one hardware/software device, the user ends up with various local lists at the different devices. Advantageously, in accordance with the present invention, the smart card holds a master list for synchronizing with the various different lists of the different appliances and applications.

For example, at the end of the work day, a user may synchronize his or her smart card with an address book or other personal information kept on a computer at work, and then carry the smart card with him or her. On the road, the person may need to call someone from a mobile phone or a pay phone, and accesses the smart card speed dial list by putting the smart card in the card reader on the pay phone (or mobile phone). Further, the user may read the smart card with the card reader at home, such as at his or her home telephone, set top box, or home computer. The smart card synchronizes the master list with various local lists on various devices. Advantageously, the user is able to access the most updated version of personal contact information with all the appliances and applications he or she uses.

In some applications, the smart card could also hold an electronic purse or electronic wallet that contains some virtual cash and credit card information. The smart card could be used to make purchases and payments on line. In addition, included on the smart card could be a loyalty program that rewarded the user for using his or her smart card.

In accordance with the present invention, the smart card acts primarily as a data storage device. The rendition of the data into a form that is friendly to the user is performed by each individual appliance or application, and would vary according to the capabilities of each appliance or application. For example, while on a personal computer, full information display and maximum functionality is provided.

A public phone may be limited to a four line screen and four soft-keys, and the user at a public phone may only be able to access his or her lists with minimal visual enhancement and not be able to do any form of synchronization. That is, the degree of interaction between the smart card and the appliance or application varies from device to device or application to application. Even further, in a preferred embodiment, the processing power of the smart card that is used for security purposes by storing an encrypted password or some other information that controls access to the information on the card in the memory. In yet another application, the smart card could be very useful for using, for example, a public telephone, a public Internet station, or a public e-mail device, at, for example, the public library or other place.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for managing a plurality of local lists of a single user, the plurality of local lists being located at a plurality of remote appliances wherein each appliance holds a corresponding local list and includes a card reader, the system comprising:

a compact user-carried smart card including a microprocessor and a memory storing a master list composed of personal data entries including names, addresses, telephone numbers, and email addresses, the master list being configured for synchronizing with each local list, the microprocessor being programmed to synchronize the master list with a local list on a remote appliance when the smart card is engaged with the remote appliance card reader to allow the user to carry the smart card with the master list stored in the smart card memory to various remote appliances and synchronize the master list with the various local lists of the appliances.

2. The system of claim 1 wherein an access type of remote appliance is configured to display a list and includes a card reader, and wherein the microprocessor is further programmed to send the master list to the access type remote appliance for display thereon when the smart card is engaged with the remote appliance card reader of the access type remote appliance.

3. The system of claim 1 wherein at least one of the entries is an electronic bookmark.

4. The system of claim 1 wherein the memory also stores an electronic wallet.

5. The system of claim 1 wherein at least one of the entries is a password.

6. The system of claim 1 wherein the memory stores an encrypted smart card password to control access to the master list.

7. A system for managing a plurality of local lists of a single user, the system comprising:

a plurality of remote appliances for use on different networks wherein each appliance holds a corresponding local list of the plurality of local lists, and each appliance includes a card reader; and a compact user-carried smart card including a microprocessor and a memory storing a master list composed of personal data entries including names, addresses, telephone numbers, and email addresses, the master list being configured for synchronizing with each local list, the microprocessor being programmed to synchronize the master list with a local list on a remote appliance when the smart card is engaged with the remote appliance card reader to allow the user to carry the smart card with the master list stored in the smart card memory to various remote appliances and synchronize the master list with the various local lists of the appliances.

8. The system of claim 7 wherein the plurality of remote appliances includes at least one access type of remote appliance configured to display a list and including a card reader, and wherein the microprocessor is further programmed to send the master list to the access type remote appliance for display thereon when the smart card is engaged with the remote appliance card reader of the at least one access type remote appliance.

9. The system of claim 7 wherein the plurality of remote appliances includes web-enabled appliances and non-web-enabled appliances.

10. The system of claim 7 wherein at least one of the entries is an electronic bookmark.

11. The system of claim 7 wherein the memory also stores an electronic wallet.

12. The system of claim 7 wherein at least one of the entries is a password.

13. The system of claim 7 wherein the memory stores an encrypted smart card password to control access to the master list.

14. A method for managing a plurality of local lists of a single user, the method comprising:

storing a plurality of local lists on a plurality of corresponding remote appliances, each appliance including a card reader; and storing a master list composed of personal data entries including names, addresses, telephone numbers and email addresses on a compact user-carried smart card including a microprocessor and a memory for storing the master list, the master list being configured for synchronizing with each local list, the microprocessor being programmed to synchronize the master list with a local list on a remote appliance when the smart card is engaged with the remote appliance card reader.

15. The method of claim 14 further comprising:

synchronizing the master list with at least one of the local lists.

16. The method of claim 14 wherein the plurality of remote appliances includes an access type of remote appliance configured to display a list and including a card reader, and wherein the method further comprises:

sending the master list to the access type remote appliance for display thereon when the smart card is engaged with the remote appliance card reader of the access type remote appliance.

* * * * *